March 8, 1938. R. W. AYER 2,110,543
TAIL WHEEL STRUCTURE
Filed April 30, 1936
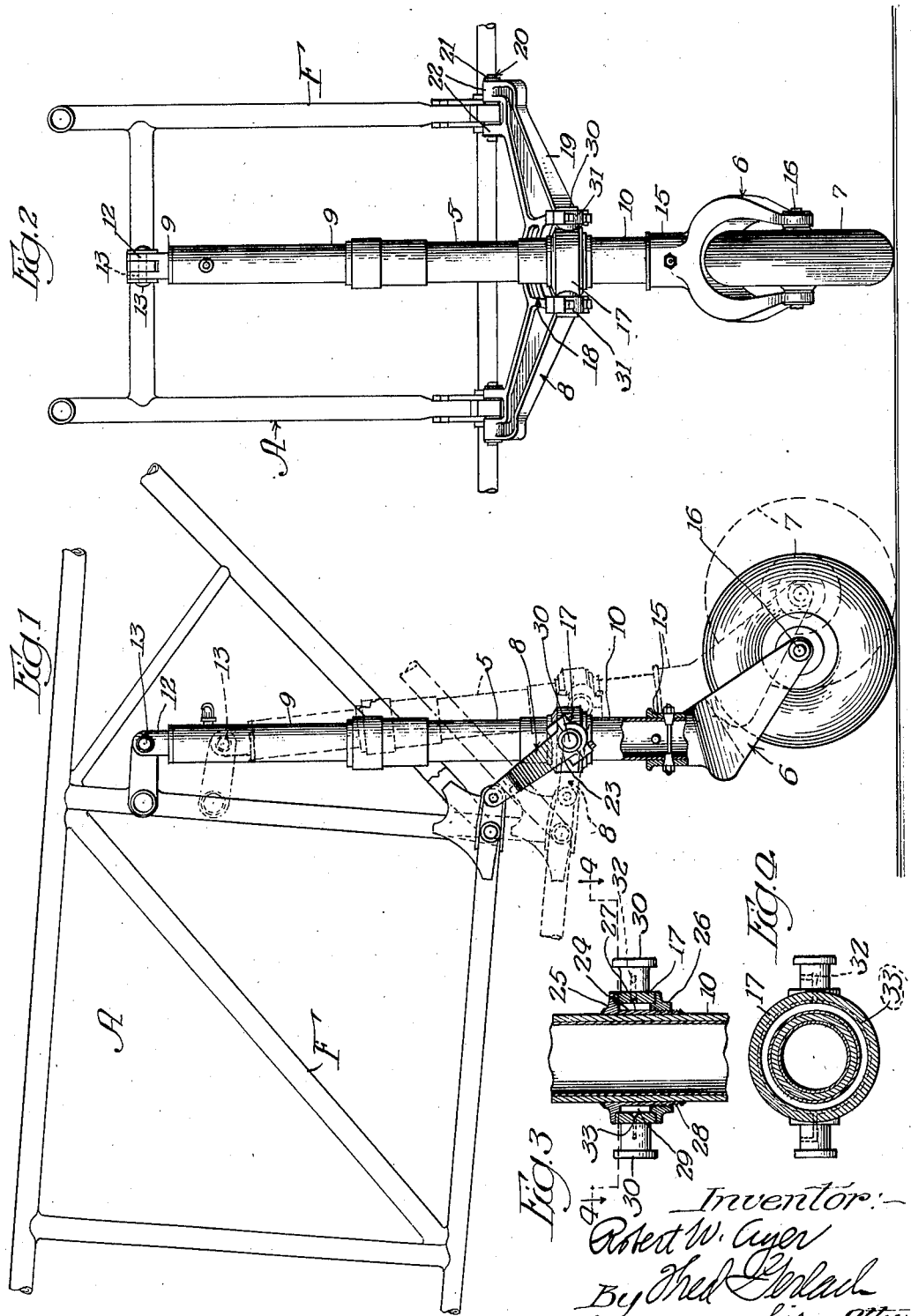

UNITED STATES PATENT OFFICE 2,110,543

TAIL WHEEL STRUCTURE

Robert W. Ayer, Wayne, Mich., assignor, by mesne assignments, to Aviation Manufacturing Corporation, Chicago, Ill., a corporation of Delaware Application April 30, 1936, Serial No. 77,169

2 Claims. (Cl. 244—109)

The present invention relates generally to tail wheel structures for airplanes. More particularly the invention relates to that type of airplane tail wheel structure which is associated with the rear or tail end of the fuselage of the airplane and comprises a substantially vertical oleo strut and a fork which is fixedly secured to the lower end of the lower part of the strut and carries a tail wheel in an eccentric position with respect to the axis of the strut.

One object of the invention is to provide a tail wheel structure of this type which is an improvement upon previously designed structures for the same purpose by reason of the fact that the construction thereof and the arrangement of its parts are such the wobbling or "shimmeying" of the tail wheel is effectively prevented during landing and taxiing of the airplane with which the structure is employed and the riding characteristics or properties of the airplane are extremely soft. The improved airplane tail wheel structure is characterized by the fact that the oleo strut is pivotally connected at its upper end so that it is free to swing lengthwise of the fuselage of the airplane and is further characterized by the fact that it includes a yoke type element which extends forwardly and upwardly from a collar on the lower part of the oleo strut and is hinged at its rear end to the collar and at its front end to the fuselage so that it operates when there is an upward and backward load placed on the tail wheel as occurs in landing or taxiing of the airplane and the parts of the oleo strut as a result are moved or slid together to cause the tail wheel to swing rearwards and upwards relatively to the rear end of the fuselage in order to avoid wobble or "shimmey" thereof and to soften the riding properties or characteristics of the airplane.

Another object of the invention is to provide an airplane tail wheel structure of the type and character under consideration in which the lower part of the oleo strut is free to rotate relatively to the upper part of the strut and the collar is loose or freely rotatable on the lower part of the strut so that the tail wheel may swivel completely around the axis of the strut.

A further object of the invention is to provide an airplane tail wheel structure which is generally of new and improved construction, may be manufactured at a low and reasonable cost, and combines lightness of weight with durability of construction.

Other objects of the invention and the various advantages and characteristics of the present tail wheel structure will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a view partly in side elevation and partly in vertical section of an airplane tail wheel structure embodying the invention;

Figure 2 is a rear view of the structure;

Figure 3 is a vertical section through the portion of the lower part of the oleo strut which carries the collar to which is pivoted the rear end of the yoke type element for causing the tail wheel to swing upwards and rearwards with respect to the rear or tail end of the fuselage when the parts of the strut are collapsed or slid together as the result of an upward and backward load being placed on the tail wheel during landing or taxiing of the airplane; and Figure 4 is a horizontal section taken on the line 4—4 of Figure 3.

The tail wheel structure which forms the subject matter of the invention is designed for use in connection with an airplane A. The latter is shown more or less diagrammatically in the drawing and embodies a fuselage F, the rear end of which supports the usual elevators and rudder for controlling the airplane. The tail wheel structure, as shown in the drawing, is associated with the rear end of the fuselage. It serves as a support for the rear end of the airplane when the latter is on the ground and comprises as the essential parts thereof an oleo strut 5, a fork 6, a tail wheel 7 and a yoke 8.

The oleo strut 5 extends substantially vertically and consists of an upper part 9 and a lower part 10. The upper part is tubular and has at its upper end a cap 11 with an upstanding lug 12. The strut is pivotally connected at its upper end to a pin 13 so that it is free to swing lengthwise of the fuselage. The pin 13 is fixedly secured within the rear end of the fuselage and extends through a hole 14 in the lug 12. The lower part 10 of the strut like the upper part 9 is tubular. It projects below the rear end of the fuselage F and fits slidably around the lower end of the upper part. The strut serves as a shock absorbing medium between the tail wheel 7 and the rear end of the fuselage. It includes means (not shown) for limiting relative sliding movement of the two parts thereof and has suitable means within the two struts whereby the lower part 10 is urged into its fully extended position with respect to the upper part 9 and sliding movement of the two parts is cushioned or retarded. When the airplane A is in flight the lower part 10 of the strut is fully extended with respect to the upper part. When during landing of the airplane the tail wheel 7 is brought into contact with the ground the weight of the rear end of the fuselage causes the two parts of the strut to slide together and the cushioning means within the strut serves to retard the sliding action and absorbs the various shocks which are incident to landing. The lower part 10 of the strut is connected to the upper part so that it is free to turn or revolve about the axis of the strut.

The fork 6 is in the form of a one piece casting and includes a socket 15 in which fits the lower end of the lower part 10 of the strut. The fork and lower part of the strut are fixedly or rigidly connected together by means of a pair of bolts which are disposed at right angles to one another and extend transversely through the socket and the lower end of the lower part 10. The side or bifurcated members of the fork extend downwardly and rearwardly from the socket 15, as shown in the drawing, and support at their extreme lower ends a horizontally extending axle 16. The tail wheel 7 is disposed between the side members of the fork and is rotatably mounted on this axle. By reason of the fact that the side parts of the fork extend downwardly and rearwardly from the socket the wheel 7 is eccentrically disposed with respect to the oleo strut 5 and thus tends to assume a trailing position with respect to the direction of travel or movement of the rear end of the fuselage. Because the lower part 10 of the strut it free to revolve with respect to the upper part 9 the tail wheel 7 is supported so that it can rotate bodily or swivel around the axis of the strut.

The yoke 8, like the fork 6, is in the form of a one piece casting. It extends between the rear end of the fuselage and a freely rotatable collar 17 on the lower end of the lower part 10 of the oleo strut and comprises a rearwardly extending bifurcated member 18 and a pair of arms 19. The arms 19 extend in opposite directions from the bifurcated member 18 and are connected by hinges 20 to the rear end of the fuselage so that the yoke is free to swing vertically. The hinges are located at the outer ends of the arms 19 and comprise pins 21 and pivot lugs 22. The pins are carried by and extend transversely of the rear or tail end of the fuselage and pass through holes in the lugs 22. The lugs are formed integrally with and project forwardly from the outer ends of the arms. The bifurcated part 18 consists of a pair of laterally spaced side pieces 23 which straddle the collar 17. This collar, as shown in the drawing, surrounds a sleeve 24 and fits loosely between an annular flange 25 at one end of the sleeve and a nut 26 at the other end of the sleeve. The sleeve 24 fits around and is welded to the lower end of the lower part 10 of the oleo strut and has an annular centrally disposed groove 27 in the outer periphery thereof. The nut 26 is attached to the sleeve by means of a screw thread connection 28 and is held in spaced relation with respect to the flange 25 by way of a pair of blocks 29 in the groove 27. The blocks are preferably disposed one diametrically opposite the other and space the nut from the flange so that the collar 29 is free to revolve relatively to the sleeve. The collar embodies a pair of diametrically opposite trunnions 30 which are journalled in a pair of bearings 31 at the rear ends of the side pieces 23 of the bifurcated member 18 of the yoke and together with the bearings form a pivotal connection between the collar and the distal end of the yoke. The sleeve 24 is positioned on the lower end of the lower part 10 of the oleo strut so that when the strut is in its extended position the yoke 8 extends downwardly and rearwardly from the hinges 20 at an angle of approximately 45° with respect to the horizontal. By so positioning the sleeve to the yoke operates when the two parts of the strut slide together to cause the wheel 7 to swing rearwardly and upwardly with respect to the rear end of the fuselage F. Because of the action of the yoke and the resultant rearward and upward swinging of the tail wheel with respect to the fuselage when the parts of the strut slide together, the wheel is not likely to wobble or "shimmey" and the riding and taxiing characteristics of the airplane are materially improved. The yoke 8 is comparatively short as far as the oleo strut is concerned and hence the angle or amount of rearward swing of the tail wheel is limited. By reason of the fact that the yoke extends downwardly and rearwardly at an angle of approximately 45° with respect to the horizontal when the parts of the strut are in their extended position the tail wheel when brought into contact with the ground during landing of the airplane A travels rearwards during the early part of what may be termed the compression stroke and then swings upwards during the remainder of the stroke. Because the collar 17 is rotatable with respect to the sleeve swinging or swiveling of the tail wheel about the axis of the strut is in no way impaired. In order properly to lubricate the bearings 31 the tunnions 30 are provided with L-shaped oil passages 32. The groove 27 in the outer periphery of the sleeve 24 is adapted to be filled with oil and a portion of this oil flows to the passages 32 by way of an annular groove 33 in the inner periphery of the collar. The passages 32 lead from the groove to the side faces of the trunnions and thus permit oil to flow from the groove 27 to the bearings 31.

The operation of the tail structure is as follows: When the airplane is in flight the strut parts 9 and 10, as hereinbefore pointed out, are in their extended position. When during landing of the airplane the tail wheel 7 is brought into contact with the ground an upward and backward load is placed on the wheel and this causes the parts 9 and 10 of the oleo strut to slide together and to absorb the shock incident to landing. During the sliding of the two strut parts the yoke 8 swings upwardly and rearwardly and hence causes the tail wheel 7 to swing upwards and rearwards with respect to the tail or rear end of the fuselage. Because of this upwards and rearwards swinging of the tail wheel with respect to the fuselage wobbling or "shimmeying" of the wheel is prevented and the wheel rides smoothly over the ground.

The herein described tail wheel structure because of the fact that it embodies but a small number of parts may be manufactured at a low and reasonable cost and it is extremely easy to maintain and results in exceptionally soft riding characteristics or properties as far as the airplane with which it is associated is concerned. Since the entire load is absorbed by the oleo strut the tail wheel structure is exceptionally strong and durable and affords good shock absorbing characteristics without any unnecessary increase in weight.

The invention is not to be understood as restricted to the details set forth, since these may be modified within the scope of the appended claims, without departing from the spirit and scope of the invention.

Having thus described the invention what I claim as new and desire to secure by Letters Patent is:

1. In combination with an airplane, a tail wheel structure comprising a substantially vertical oleo strut pivotally connected at its upper end to the rear end of the fuselage so as to swing lengthwise of the fuselage and consisting of an upper part and a lower part connected telescopically and rotatably to the upper part and means for urging the two parts apart, a tail wheel connected eccentrically to the lower part of the strut and supported by said part so that it is free to swivel, a collar mounted rotatably on the lower part of the strut and held against axial displacement relatively thereto and an element extending forwardly and upwardly from the collar, hinged at its rear end to the collar and at its front end to said rear end of the fuselage, and adapted when the tail wheel is subjected to an upward and rearward load during taxiing or landing of the airplane and the parts of the strut are caused as a result to move toward one another to control the tail wheel so that it swings rearwards with respect to the rear end of the fuselage during the initial movement together of the two strut parts and then upwardly during the remainder of such movement.

2. In combination with an airplane, a tail wheel structure comprising a substantially vertical oleo strut pivotally connected at its upper end to the rear end of the fuselage so as to swing lengthwise of the fuselage and consisting of an upper part and a lower part connected telescopically and rotatably to the upper part and means for urging the two parts apart, a tail wheel connected eccentrically to the lower part of the strut and supported by said part so that it is free to swivel, a collar provided with diametrically opposite outwardly extending trunnions and mounted on the lower part of the strut so that it is free to rotate and is confined against axial displacement relatively thereto, and a yoke extending normally forwardly and upwardly from the collar at substantially an angle of 45° with respect to the horizontal, having the bifurcations thereof in straddled relation with respect to the collar and pivotally connected to the trunnions and its front end hinged to said rear, and adapted when the tail wheel is subjected to an upward and rearward load during taxiing or landing of the airplane and the parts of the strut are caused as a result to move toward one another to control the tail wheel so that it swings rearwards with respect to the rear end of the fuselage during the initial movement together of the two strut parts and then upwardly during the remainder of such movement.

ROBERT W. AYER.